United States Patent
Carroll et al.

(10) Patent No.: US 6,651,098 B1
(45) Date of Patent: Nov. 18, 2003

(54) WEB SITE MANAGEMENT IN A WORLD WIDE WEB COMMUNICATION NETWORK THROUGH REASSIGNMENT OF THE SERVER COMPUTERS DESIGNATED FOR RESPECTIVE WEB DOCUMENTS BASED UPON USER HIT RATES FOR THE DOCUMENTS

(75) Inventors: Scott Allen Carroll, Elgin, TX (US); Gerald Francis McBrearty, Austin, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,237

(22) Filed: Feb. 17, 2000

(51) Int. Cl.[7] .................. G06F 15/173; G06F 15/16; G06F 17/60
(52) U.S. Cl. .................. 709/224; 709/226; 709/223; 709/229; 709/203; 709/217; 705/14; 705/53
(58) Field of Search .................. 709/223, 226, 709/224; 705/14, 53, 52

(56) References Cited

U.S. PATENT DOCUMENTS

| | | | |
|---|---|---|---|
| 6,006,264 A | * 12/1999 | Colby et al. | 709/226 |
| 6,070,191 A | * 5/2000 | Narendran et al. | 709/226 |
| 6,173,322 B1 | * 1/2001 | Hu | 709/224 |
| 6,314,463 B1 | * 11/2001 | Abbott et al. | 709/224 |
| 6,317,786 B1 | * 11/2001 | Yamane et al. | 709/224 |
| 6,321,256 B1 | * 11/2001 | Himmel et al. | 709/224 |
| 6,430,618 B1 | * 8/2002 | Karger et al. | 709/225 |
| 2002/0042823 A1 | * 4/2002 | DeBettencourt et al. | 709/224 |

* cited by examiner

Primary Examiner—David Wiley
Assistant Examiner—Joseph E Avellino
(74) Attorney, Agent, or Firm—Jerry B. Kraft; Volel Emile; Cynthia S. Byrd

(57) ABSTRACT

A World Wide Web (Web) distribution site monitors hit rates for the Web documents distributed through the site and applies its server computer resources to meet surges in hit rates for the various Web documents. A Web server system is provided for accessing said Web documents from resource databases and transmitting said Web documents onto said Web comprising a plurality of server computers of different computer powers at a resource location, a plurality of Web documents, each accessible from said resource database by a designated at least one of said server computers. The rate of user hits for each of said plurality of Web documents is monitored, and the server computers for said respective Web documents are designated based upon said rate of user hits. The server computers of the most computer power are designated for the Web documents having the highest hit rate. If needed, a plurality of said server computers may be designated for the Web documents having the highest hit rates.

8 Claims, 5 Drawing Sheets

WEB SITE MANAGEMENT IN A WORLD
WIDE WEB COMMUNICATION NETWORK
THROUGH REASSIGNMENT OF THE
SERVER COMPUTERS DESIGNATED FOR
RESPECTIVE WEB DOCUMENTS BASED
UPON USER HIT RATES FOR THE
DOCUMENTS

TECHNICAL FIELD

The present invention relates to computer managed communication networks such as the World Wide Web (Web) and, particularly, to the management and effective operation of Web Sites from which Web documents, such as Web pages and Web programs, are distributed in response to user requests.

BACKGROUND OF RELATED ART

The 1990's have been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents including media and programs. The convergence of the electronic entertainment and consumer industries with data processing exponentially accelerated the demand for wide ranging communication distribution channels and the Web or Internet, which had quietly existed for over a generation as a loose academic and government data distribution facility, reached "critical mass" and commenced a period of phenomenal expansion. With this expansion, businesses and consumers have direct access to all matter of documents including media and computer programs.

In addition, Hypertext Markup Language (HTML), which had been the documentation language of the Internet or Web for years, offered direct links between Web pages. This even further exploded the use of the Internet or Web. Because of the vast number of users who now have access to the Web, the demand for Web documents can be very volatile. Since the Web and Web documents are frequently the subject of media attention, the public demand for Web documents can change rapidly. A Web document which has been getting only casual user attention may suddenly become the subject of great media attention with the result that the hit rate for the Web document soars. The hit rate is a measure of the frequency with which a Web document is accessed and is, thus, understood to cover the number of requests for the document over a determined period of time.

Web documents are provided from a Web distribution site usually made up of one or more server computers which access the document from a resource database in response to a user request sent over the Web through a Web browser on the user's receiving Web station. Significant Web distribution sites are made up of a plurality of server computers coordinated through a primary one of said servers. Such significant Web distribution sites usually serve large institutions such as corporations, universities, retail stores or governmental agencies. These distribution sites may also provide to smaller businesses or organizations support for and distribution of individual Web pages created, owned and hosted by the individual small businesses and organizations.

In such Web distribution sites, each of the Web documents or pages are assigned to one of the server computers which supports and distributes the respective Web documents or pages. Any surge in demand or hit rate for a particular page at such a Web distribution site could, at times, present problems which would significantly slow the access to the page or document or even choke off the distribution of the document.

SUMMARY OF THE PRESENT INVENTION

The present invention provides a system whereby the Web distribution site may monitor hit rates for the Web documents distributed through the site and apply its server computer resources to meet surges in hit rates for the various Web documents.

In its broadest aspects, the present invention provides a Web server system for accessing said Web documents from resource databases and transmitting said Web documents onto said Web comprising a plurality of server computers of different computer powers at a resource location, a plurality of Web documents, each accessible from said resource database by a designated at least one of said server computers, means for monitoring the rate of user hits for each of said plurality of Web documents, and means for designating the server computers for said respective Web documents based upon said rate of user hits. The means for designating said server computers designate the server computers of the most computer power for the Web documents having the highest hit rate. If needed, a plurality of said server computers may be designated for the Web documents having the highest hit rates.

The Web site server distribution system may further include means for setting selected levels of increase in the rate of user hits for each of said plurality of Web documents, and means responsive to said level for one of said plurality of Web documents for changing the order of designation of server computers for said respective Web documents. This changed order of designation may be ordered with the server computer with the highest computer power designated for the Web document with the highest rate of hits down to the server computer with the lowest computer power designated for the Web document with the lowest rate of hits.

The server distribution system may be set up so that there is a primary server computer, and said means for designating the server computers for said respective Web documents is included in said primary server computer.

The present invention may also be applied to a method of Web document distribution from a Web resource site having a plurality of server computers of different computer powers which comprises storing at said Web resource site a plurality of source Web documents, each stored document having content controlled by a respective host, distributing the content of each of said stored source documents to Web receiving display stations in response to hits for said documents made from said receiving display stations, monitoring the rate of user hits for each of said stored plurality of source Web documents, and designating the server computers for said respective Web documents based upon said rate of user hits.

With this approach, each Web document host may be charged a distribution fee related to said rate of user hits for each document. This process could involve setting a selected level of increase in the rate of user hits for each of said plurality of Web documents. Then, in response to reaching this level of increase in the rate of user hits for one of said plurality of Web documents, the host of the documents could be offered an increase in said distribution fee, and the order of designation of server computers for said respective Web documents could be changed responsive to said host accepting said level of increase in said distribution fee.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
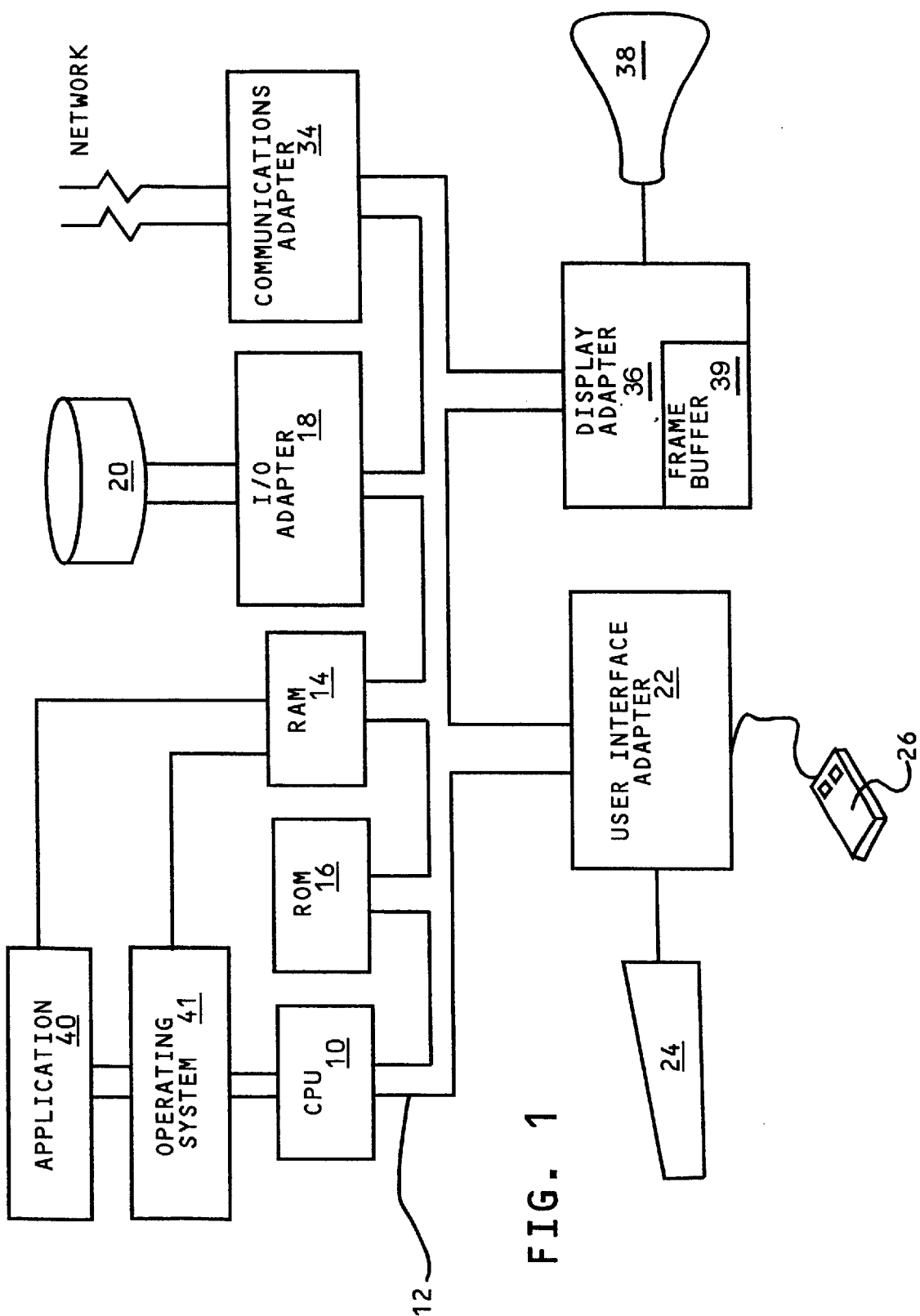
FIG. 1 is a block diagram of a data processing system including a central processing unit and network connections via a communications adapter which is capable of functioning as any of the server computers in the Web distribution site or as a user interactive Web station for receiving Web pages.
Figure 2:
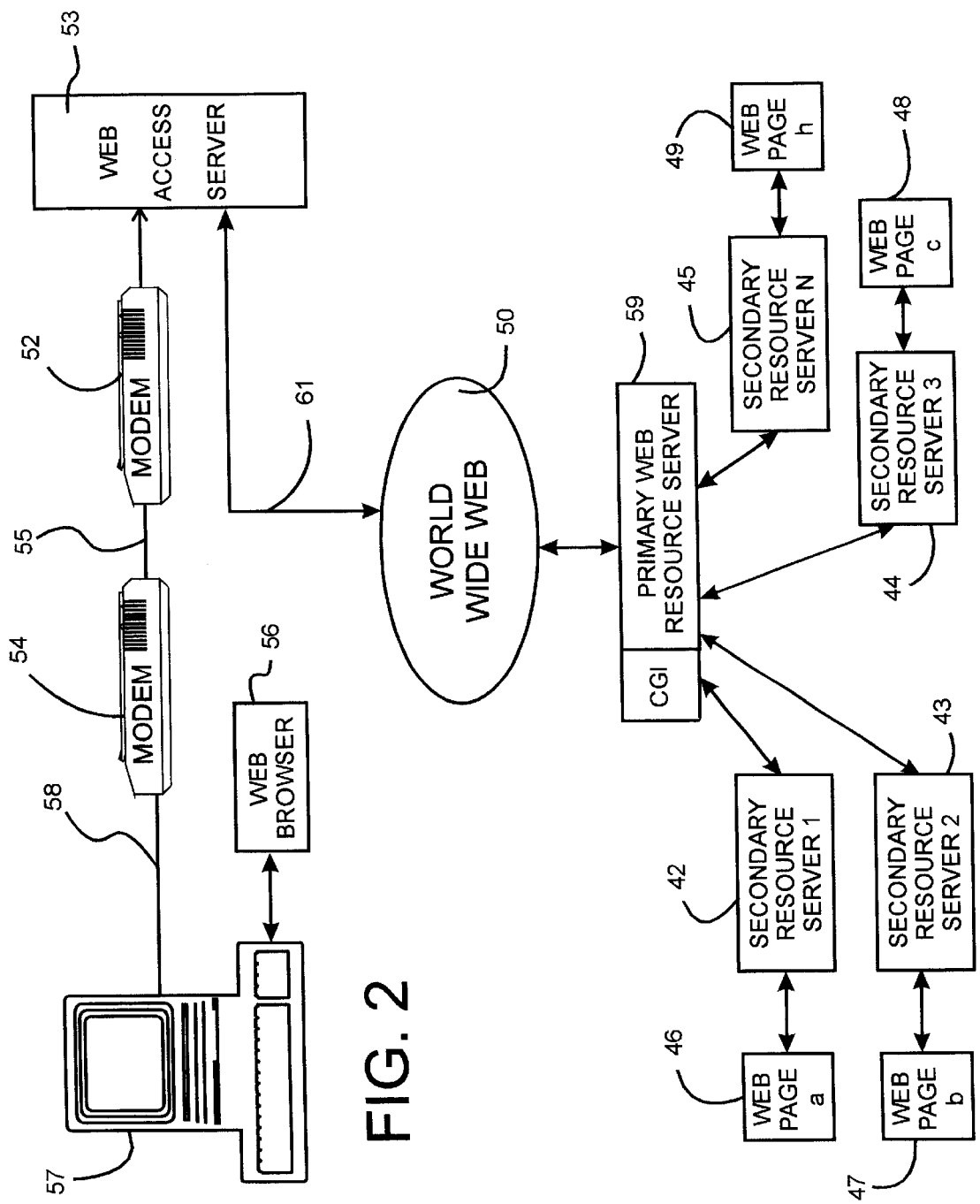
FIG. 2 is a generalized diagrammatic view of a Web portion showing how the Web may be accessed from the Web stations for the requesting Web pages and the Web distribution site of the present invention for distributing such Web pages.

Referring to FIG. 1, a typical data processing system is shown which may function as the computer controlled network terminals or Web stations used conventionally as any of the receiving Web stations for requesting Web pages; the system shown is also illustrative of any of the server computers used in the Web distribution sites to be described in greater detail with respect to FIG. 2.

A central processing unit (CPU) 10, may be one of the commercial PC microprocessors; when the system shown is used as a server computer at the Web distribution site to be subsequently described, then a workstation is preferably used, e.g. RISC System/6000™ (RS/6000) series available from International Business Machines Corporation (IBM). The CPU is interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows 98™ or Windows NT™, as well as UNIX and AIX operating systems. Application programs 40, controlled by the system, are moved into and out of the main memory Random Access Memory (RAM) 14. These programs include the programs of the present invention for the tracking of Web page hits at the Web distribution site and for reallocation or redesignation of servers assigned to the Web documents. Where the computer system shown functions as the receiving Web station, then any conventional Web browser application program, such as the Netscape Navigator 3.0™ or Microsoft's Internet Explorer™, will be available for accessing the Web pages from the Web to the receiving station. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network enabling the computer system to communicate with other such computers over a local area network (LAN), e.g. the related server computers at the Web distribution site or through the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user at a receiving station may interactively relate to the Web in order to access Web documents. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods which may be related to the present invention. Since a major aspect of the present invention is directed to Web documents or pages transmitted over global networks, such as the Web or Internet, an understanding of networks and their operating principles would be helpful. We will not go into great detail in describing the networks to which the present invention is applicable. For details on Internet nodes, objects and links, reference is made to the text, *Mastering the Internet*, G. H. Cady et al., published by Sybex Inc., Alameda, Calif., 1996.

Any data communication system which interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. A combination of such computer servers function at Web distribution sites to access requested Web documents from resource databases and to distribute such accessed documents to the requesting receiving stations over the Web. Web documents are conventionally implemented in HTML language, which is described in detail in the text entitled *Just Java*, van der Linden, 1997, SunSoft Press, particularly at Chapter 7, pp. 249–268, dealing with the handling of Web pages; and also in the above-referenced *Mastering the Internet*, particularly at pp. 637–642, on HTML in the formation of Web pages. In addition, a general and comprehensive description of browsers may be found in the above-mentioned *Mastering the Internet* text at pp. 291–313.

A generalized diagram of a portion of the Web for illustration of the Web distribution site of the present invention is shown in FIG. 2. The computer controlled display terminal 57 used for Web page receiving may be implemented by the computer system setup in FIG. 1, and connection 58 (FIG. 2) is the network connection shown in FIG. 1. For purposes of the present embodiment, computer 57 serves as a Web display station for receiving the Web documents. Reference may be made to the above-mentioned *Mastering the Internet,* pp. 136–147, for typical connections between local display stations to the Web via network servers, any of which may be used to implement the system on which this invention is used.

The system embodiment of FIG. 2 has a host-dial connection. Such host-dial connections have been in use for over 30 years through network access servers 53 which are linked 61 to the Web 50. The servers 53 may be maintained by a service provider to the client's display terminal 57. The host's server 53 is accessed by the client terminal 57 through a normal dial-up telephone linkage 58 via modem 54, telephone line 55 and modem 52. The HTML file representative of the Web documents is downloaded to display terminal 57 through Web access server 53 via the telephone line linkages from server 53 which may have accessed them from the Internet 50 via linkage 61.

The Web site distribution elements used in the implementation of the present invention are made up of primary Web resource computer server 59 connected to the Web 50 which manages the other secondary Web resource computer servers: secondary resource server (1) 42, secondary resource server (2) 43, secondary resource server (3) 44 and secondary resource server (n) 45. These servers are respectively assigned to support and service Web page (a) 46, Web page (b) 47, Web page (c) 48 and Web page (n) 49. These secondary servers function in response to Web document requests or hits to access the source Web page 46, 47, 48 or 49 from its respective resource database and have a copy of the accessed source page sent via the Web 50 to the requesting Web station 57. As will be described in greater detail with respect to the programs described in FIGS. 3, 4 and 5, the present invention provides for the monitoring of the hit rates for respective Web pages and for reassigning the secondary servers servicing the respective Web pages or documents responsive to changes in the hit rates.

It will be understood that the secondary server computers, 42, 43, 44 and 45 at the conventional Web document distribution site, will customarily have differing computer powers. Computer powers are usually associated with computer instruction process speed. A suitable definition of computer power for the purpose of this description may be found at page 110 of the *Microsoft Press Computer Dictionary,* 1997, Redmond, Wash. Computer power is defined as the measure of the ability of the computer to perform work. It may be further defined as the number of instructions that the computer can carry out in a given time; it is thus measured in millions of instructions per second (MIPS) or millions of floating point operations per second (MFLOPS). Other factors which may be involved in determining the power of a computer are the amount of available RAM and the number of bits (16, 32 or 64) handled by the computer at one time.

In the operations according to the present invention, the secondary server computers assigned to the respective Web documents are so related to the hit rates for the documents that the hit rate for a Web document will not exceed the computer power of the designated server to efficiently service the Web document demands. Accordingly, since demand is often very flexible on the Web, the hit rate is monitored and the secondary server computers are reassigned to Web pages on the basis that the Web document at the Web distribution site with the highest hit rate will be assigned the secondary server with the most computer power and so on. The monitoring of hit rates and reassignment of the secondary server computers based on rates is carried out in the primary Web resource computer server 59 with programs to be subsequently described. While this reassignment or reordering of the assigned secondary servers is automatic and continuous, it is not preferably done in response to minor hit rate fluctuations. The present invention permits the setting of selected levels of increase in the rate of user hits for each of said plurality of Web documents, and means responsive to said level for one of said plurality of Web documents for then changing the order of designation of server computers for said respective Web documents. The selected levels should represent significant hit rate changes.

The monitoring and reassignment of servers is preferably done in the CGI (Common Gateway Interface) of the primary Web server computer 59. The CGI in the primary server 59 controls communications between server and resources. The CGI controls the Web site server and the Web page interactivity. CGI functions are described in the *Microsoft Press Computer Dictionary* at pp. 85.

Figure 3:
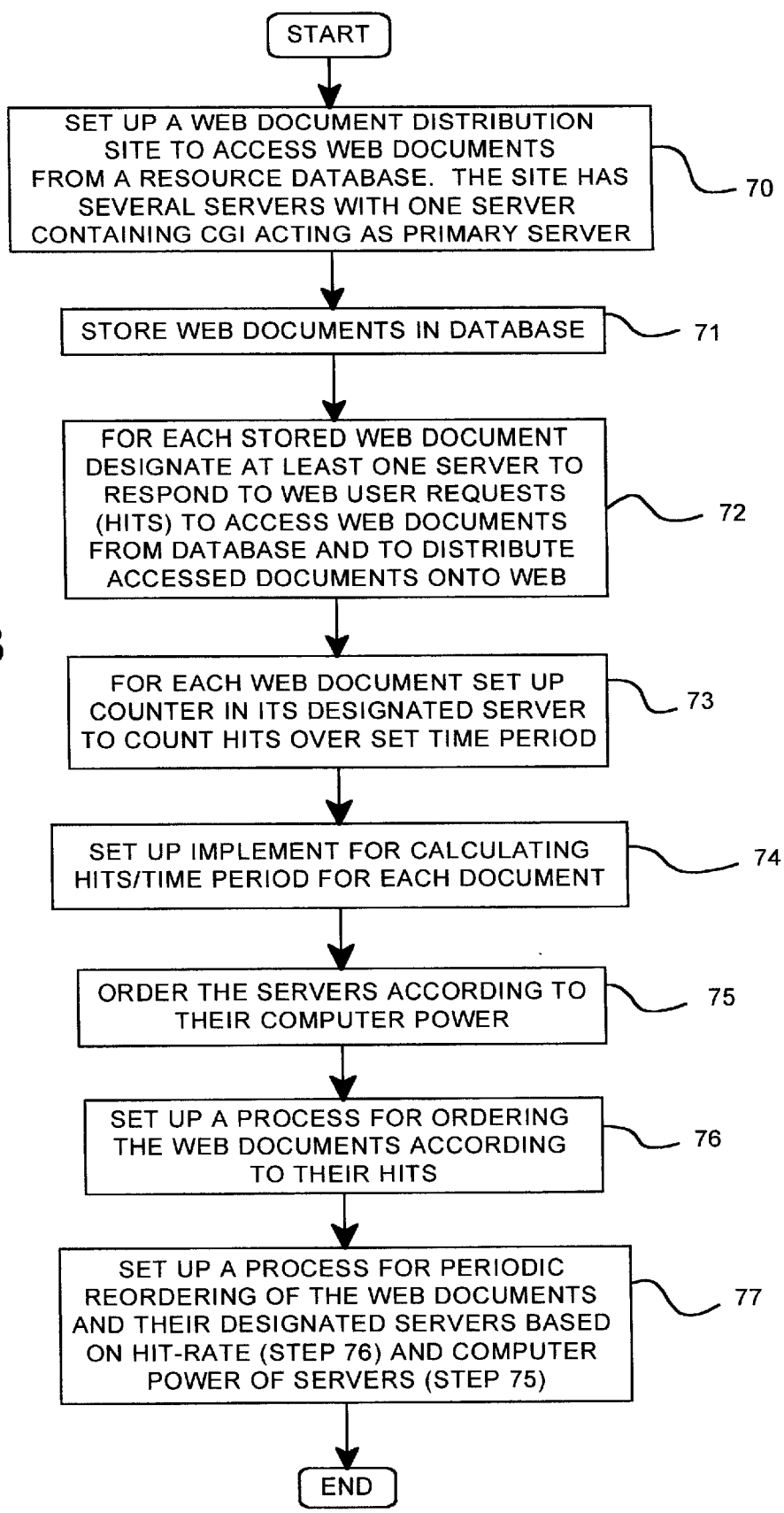
FIG. 3 is an illustrative flowchart describing the setting up of a Web distribution site with a process for tracking hits on Web pages distributed through the site, and for reallocating computer server resources at the site in response to changes in the hit rate.

FIG. 3 is a flowchart showing the development of a process according to the present invention for the monitoring of the hit rates at Web document distribution sites. Step 70, a Web document distribution site, such as that shown in FIG. 2, is set up to access Web documents from resource databases. The site has several servers with one server containing the CGI serving as the Primary or Managing server. The Web documents are stored in databases accessible by the servers at the Web distribution site, step 71. For each stored Web document, there is designated at least one server to respond to Web requests (hits) to access Web documents from the database and to distribute the accessed documents onto the Web, step 72. For each Web document, set the counter in its designated server computer to count the hits over a set period of time (hit rate), step 73. Set up a process for calculating the hit rate for each of the Web documents processed through the site, step 74. Note the computer power of each of the servers and set up a process for sorting and ordering the servers according to their computer power, step 75. Set up a process for sorting and ordering the Web documents according to their hit rate, step 76. Set up appropriate processes for periodically sorting and reordering the Web documents and the servers designated for such documents based upon the hit rate of the Web documents versus the computer power of the designated server for that Web document, step 77. As mentioned hereinabove, such periodic sorting may be in response to the hit rates on specified Web documents reaching specified levels.

Figure 4:
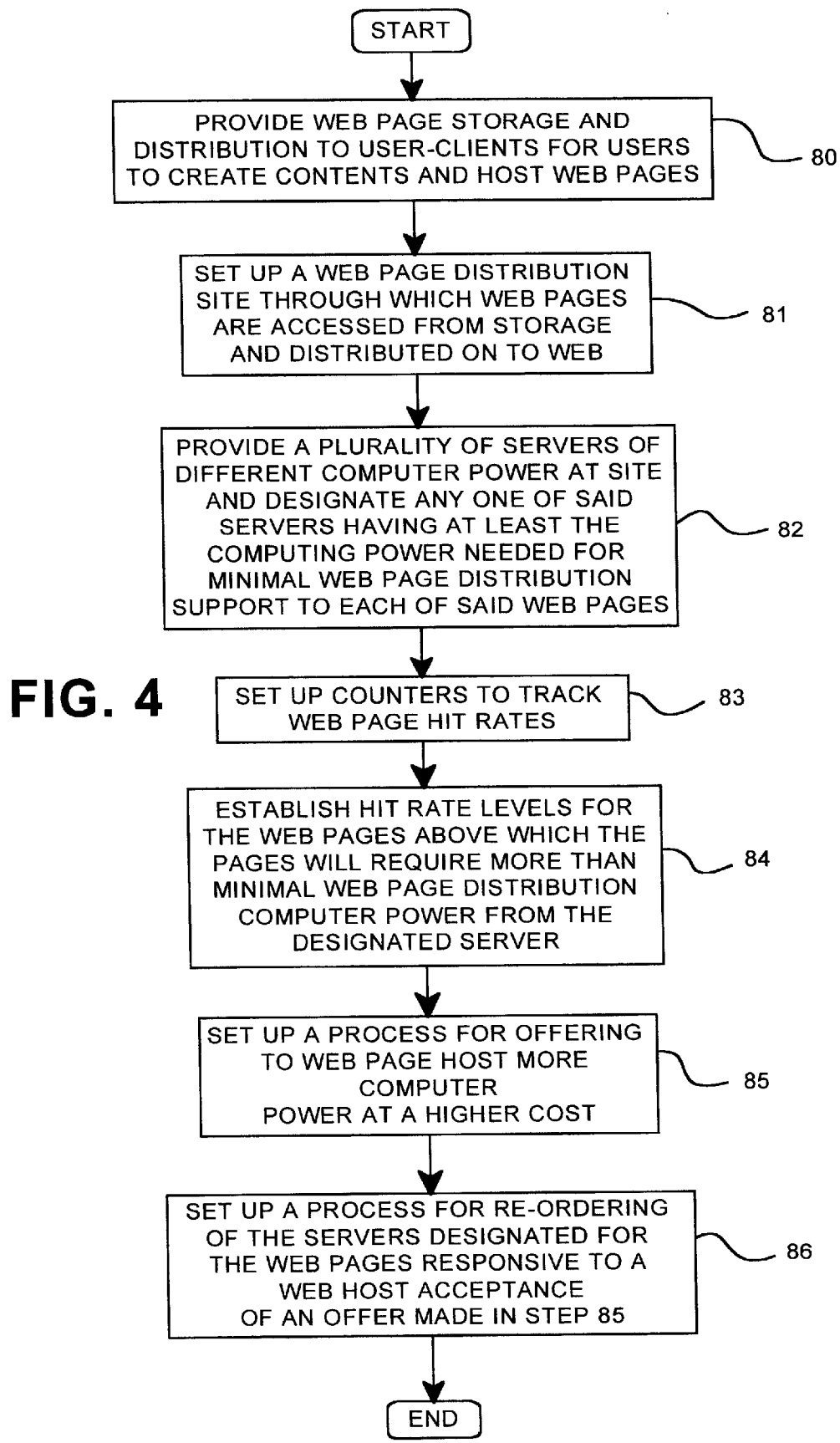
FIG. 4 is an illustrative flowchart describing the setting up of a Web distribution site like that of FIG. 3 but for a commercial Web site wherein Web page distribution and management for customers who control the content of and host their assigned Web pages.

A variation of the set up process of FIG. 3 is offered in FIG. 4 for commercial Web document distribution sites where Web distribution site providers make available to clients Web pages which the client "owns" or hosts and, thus, controls the content of the Web page which the site provider distributes in response to Web user requests (hits). Since it is difficult for the provider to initially predict the popularity of the Web page as measured by the hit rate, the provider will offer Web page support to the client at a basic fee and provide a server computer for the page of a basic computer power.

Then, if the Web page has a surge in popularity, i.e. hit rate to a specified level, the process provides for the client-host to be offered increased computer power to handle the surge at an increased fee, and, if the client accepts, the process provides for then reordering the server/Web page relationships as described above. Web page storage is provided in a database associated with a Web page distribution site for providing to user/clients Web pages which the client/users will host and provide the page contents, step 80. Then, a Web page distribution site like that described with respect to FIGS. 2 and 3 is provided through which the clients' Web pages may be accessed by requesting Web users (hits). The requested pages are accessed from the database and distributed onto the Web, step 81. A plurality of server computers of differing computer power are provided at the distribution site. Also, a process is provided for designating any one of the server computers having minimal or basic computer power for supporting minimal or basic distribution requests (hits) to each of the Web pages supported by the site, step 82. Counters are set up to track the hit rates for the supported Web pages, step 83. There is provided the capability of setting hit rate levels above which a supported Web page will require more than minimal support computer power from its designated server computer, step 84. There is provided a process for offering higher power computer support to the Web page host of a page requiring a computer of higher power, step 85. Then, set up a process for the reordering of the server computers designated for the Web pages in response to the Web page host accepting such an offer, step 86.

Figure 5:
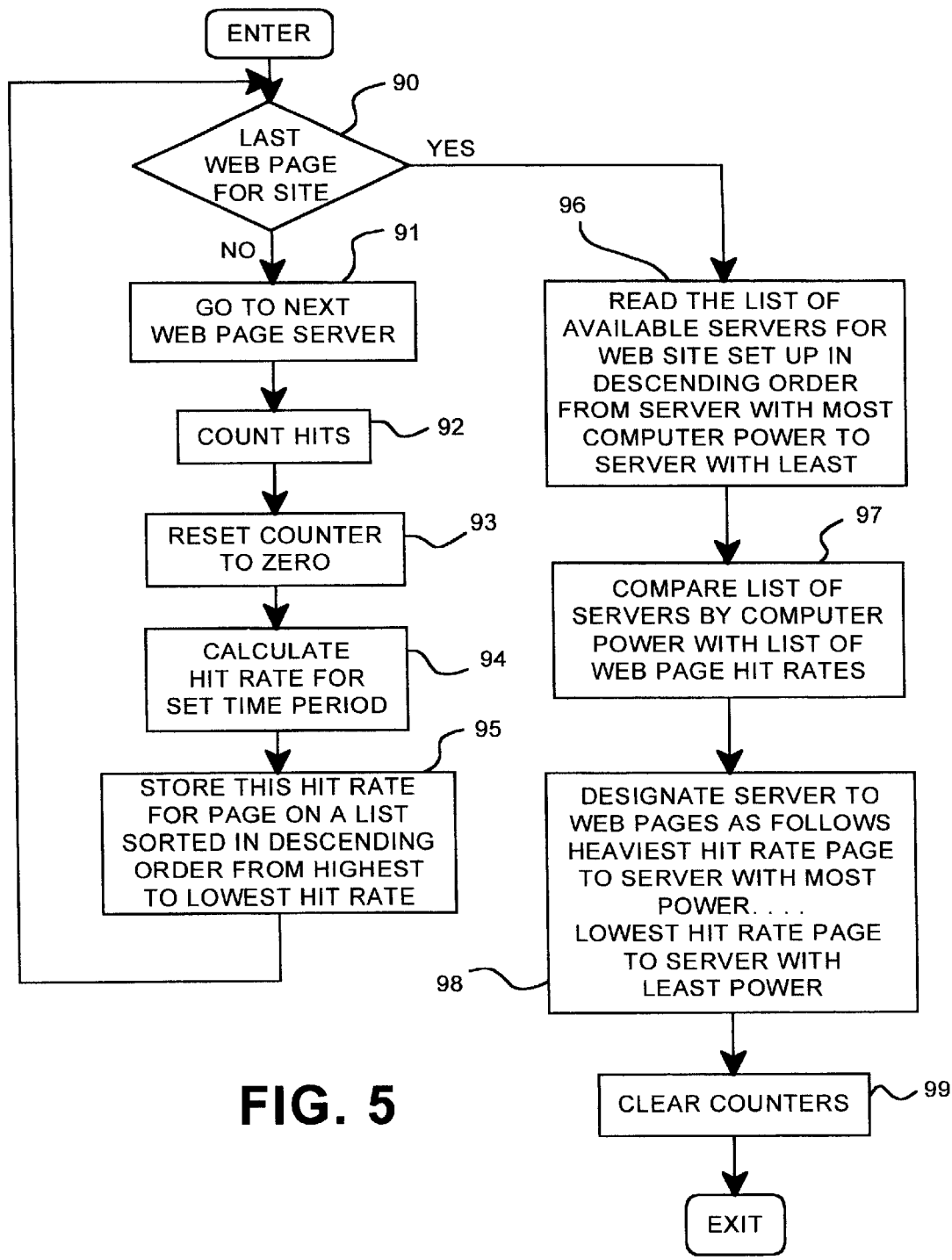
FIG. 5 is a flowchart of an illustrative run of the program set up in FIG. 3.

A simplified run of the process set up in FIG. 3 and described in connection with FIG. 2 will now be described with respect to the flowchart of FIG. 5. First, we are going to assume that there has been an event in response to which the server computers designated to support the Web pages will have to be resorted and reordered. In FIG. 5 the servers supporting the Web pages are being polled. At step 90, a determination is made as to whether we are at the last served Web page for the distribution site. If No, then, step 91, we go to the next Web page server, and, step 92, the hits are counted for the Web page serviced by this next server, and the counter is reset to zero, step 93, after which the hit rate for a set time period is calculated, step 94. Step 95, this hit rate is stored for its page on a list of the Web pages for the site, sorted in descending order from the highest to the lowest hit rate, and the process is returned to step 90 where a determination is made as to whether we were at the last Web page for the site. If step 90 is Yes, this is determined to be the last Web page for the distribution site, then in step 96, there is read the list of available server computers for the Web site developed in step 75 of FIG. 3 set up in descending order from the server with the most computer power to the server with least computer power. This list of servers by computer power is compared to the Web page by the hit rate list developed in step 95. As a result, step 98, the servers are designated to provide Web page support in the following order: the Web page with the highest hit rate serviced by the server with the most computer power . . . through . . . the Web page with the lowest hit rate serviced by the server with the least computer power. The counters are then cleared and the session is ended.

One of the preferred implementations of the present invention is in application program 40 made up of programming steps or instructions resident in RAM 14, FIG. 1, of Web server computers during various Web operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A method of Web document distribution from a Web resource site having a plurality of server computers of different computer powers comprising:

storing at said Web resource site a plurality of source Web documents, each stored document having content controlled a by respective host, distributing the content of each of said stored source documents to Web receiving display stations in response to hits for said documents made from said receiving display stations, monitoring the rate of user hits for each of said stored plurality of source Web documents, designating the server computers for said respective Web documents based upon said rate of user hits, charging each Web document host a distribution fee related to said rate of user hits for each document, setting a selected level of increase in the rate of user hits for each of said plurality of Web documents, responsive to said level of increase in the rate of user hits for one of said plurality of Web documents, offering to the host of said one documents an increase in said distribution fee, and changing the order of designation of server computers for said respective Web documents responsive to said host accepting said level of increase in said distribution fee.

2. The method of claim 1 wherein said step of designating said server computers designate the server computers of the most computer power for the Web documents having the highest hit rate.

3. The method of claim 1 wherein said step of designating said server computers designates a plurality of said server computers for the Web documents having the highest hit rates.

4. The method of claim 1 wherein said changed order of designation is ordered with the server computer with the highest computer power designated for the Web document with the highest rate of hits down to the server computer with the lowest computer power designated for the Web document with the lowest rate of hits.

5. A computer program having code recorded on a computer readable medium Web document distribution from a Web resource site having a plurality of server computers of different computer powers comprising:

means for storing at said Web resource site a plurality of source Web documents, each stored document having content controlled a by respective host, means for distributing the content of each of said stored source documents to Web receiving display stations in response to hits for said documents made from said receiving display stations, means for monitoring the rate of user hits for each of said stored plurality of source Web documents, and means for designating the server computers for said respective Web documents based upon said rate of user hits, means for charging each Web document host a distribution fee related to said rate of user hits for each document, means for setting a selected level of increase in the rate of user hits for each of said plurality of Web documents, means responsive to said level of increase in the rate of user hits for one of said plurality of Web documents, for offering to the host of said one documents an increase in said distribution fee, and means for changing the order of designation of server computers for said respective Web documents responsive to said host accepting said level of increase in said distribution fee.

6. The computer program of claim 5 wherein said changed order of designation is ordered with the server computer with the highest computer power designated for the Web document with the highest rate of hits down to the server computer with the lowest computer power designated for the Web document with the lowest rate of hits.

7. The computer program of claim 5 wherein said means for designating said server computers designate the server computers of the most computer power for the Web documents having the highest hit rate.

8. The computer program of claim 5 wherein said means for designating said server computers designates a plurality of said server computers for the Web documents having the highest hit rates.

* * * * *